US011265157B2

(12) United States Patent
Doi et al.

(10) Patent No.: US 11,265,157 B2
(45) Date of Patent: Mar. 1, 2022

(54) QUANTUM COMMUNICATION DEVICE, QUANTUM COMMUNICATION SYSTEM, AND QUANTUM COMMUNICATION METHOD

(71) Applicant: Kabushiki Kaisha Toshiba, Minato-ku (JP)

(72) Inventors: Kazuaki Doi, Kawasaki (JP); Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 123 days.

(21) Appl. No.: 15/685,050

(22) Filed: Aug. 24, 2017

(65) Prior Publication Data
US 2018/0262328 A1 Sep. 13, 2018

(30) Foreign Application Priority Data
Mar. 8, 2017 (JP) .............................. JP2017-044373

(51) Int. Cl.
*H04L 9/08* (2006.01)
*H04L 9/30* (2006.01)
(Continued)

(52) U.S. Cl.
CPC ............ *H04L 9/0858* (2013.01); *H04L 9/083* (2013.01); *H04L 9/0822* (2013.01);
(Continued)

(58) Field of Classification Search
CPC ... H04L 9/0858; H04L 9/0852; H04L 9/0822; H04L 9/083; H04L 1/00; H04L 9/0855; H04B 10/70; H04I 9/304; H03M 13/00
See application file for complete search history.

(56) References Cited

U.S. PATENT DOCUMENTS 6,532,091 B1 * 3/2003 Miyazaki ............. H04B 10/299
359/237
6,848,065 B1 * 1/2005 Nilsson ................... H04L 1/203
375/262
(Continued)

FOREIGN PATENT DOCUMENTS

JP 2015-115728 A 6/2015
JP 2015-130628 A 7/2015
WO WO 2012/074369 A1 6/2012

OTHER PUBLICATIONS

A.R.Dixon et al., "High speed and adaptable error correction for megabit/s rate quantum key distribution", Scientific Reports, 4, www.nature.com/scientificreports. 2014, pp. 6.
(Continued)

*Primary Examiner* — Lesa M Kennedy
(74) *Attorney, Agent, or Firm* — Oblon, McClelland, Maier & Neustadt, L.L.P.

(57) ABSTRACT

According to an embodiment, a quantum communication device is adapted to correct first sift key data acquired by performing sift processing with respect to a quantum bit string received from a transmission device via a quantum communication path. The quantum communication device includes a determination unit and a correction unit. The determination unit determines setting information of error correction on the first sift key data from an estimated error rate of the first sift key data and a margin of the estimated error rate. The correction unit generates corrected key data by performing the error correction with the setting information.

9 Claims, 7 Drawing Sheets (51) Int. Cl.
*H04L 29/06* (2006.01)
*H04L 9/40* (2022.01)

(52) U.S. Cl.
CPC ............ *H04L 9/0855* (2013.01); *H04L 9/304* (2013.01); *H04L 29/06* (2013.01)

(56) References Cited

U.S. PATENT DOCUMENTS

| | | | | |
|---|---|---|---|---|
| 2002/0149823 | A1* | 10/2002 | Bergano | H04B 10/2569 398/20 |
| 2007/0009098 | A1* | 1/2007 | Tanaka | H04L 1/242 380/30 |
| 2007/0223938 | A1* | 9/2007 | Gervais | H04B 10/677 398/188 |
| 2009/0044079 | A1* | 2/2009 | de Lind Van Wijngaarden | H04L 1/0009 714/774 |
| 2011/0167299 | A1 | 7/2011 | Tanaka et al. | |
| 2015/0193306 | A1 | 7/2015 | Doi et al. | |

OTHER PUBLICATIONS

A.R.Dixon et al., "Continuous operation of high bit rate quantum key distribution", Applied Physics Leters 96, 161102, 2010, pp. 4.
J.F. Dynes et al., "Stability of high bit rate quantum key distribution on installed fiber", Optics Express,16339, vol. 20, No. 15,2012,pp. 9.
Nelson J. Muga et al., "QBER Estimation in QKD Systems with Polarization Encoding", Journal of Light Wave Technology, vol. 29, No. 3, Feb. 1, 2011, pp. 355-361.

* cited by examiner

| SET ERROR RATE | CODE RATE |
|---|---|
| 2.00% | 0.837 |
| 2.01% | 0.837 |
| 2.02% | 0.836 |
| ... | ... |
| 5.00% | 0.671 |
| 5.01% | 0.670 |
| ... | ... |
| 8.98% | 0.499 |
| 8.99% | 0.498 |
| 9.00% | 0.498 |

QUANTUM COMMUNICATION DEVICE, QUANTUM COMMUNICATION SYSTEM, AND QUANTUM COMMUNICATION METHOD

CROSS-REFERENCE TO RELATED APPLICATIONS

This application is based upon and claims the benefit of priority from Japanese Patent Application No. 2017-044373, filed on Mar. 8, 2017; the entire contents of which are incorporated herein by reference.

FIELD

An embodiment described herein relates generally to a quantum communication device, a quantum communication system, and a quantum communication method.

BACKGROUND

A low density parity check (LDPC) code attracts attention as an error correction code having an error correction capability very close to the Shannon limit that is the theoretical limit value of an information transmission rate. Thus, for example, it is actively considered to implement an LDPC decoder as hardware in fields of communication, storage system, and the like.

DETAILED DESCRIPTION

According to an embodiment, a quantum communication device is adapted to correct first sift key data acquired by performing sift processing with respect to a quantum bit string received from a transmission device via a quantum communication path. The quantum communication device includes a determination unit and a correction unit. The determination unit determines setting information of error correction processing on the first sift key data from an estimated error rate of the first sift key data and a margin of the estimated error rate. The correction unit generates corrected key data by performing the error correction processing with the setting information.

In the following, embodiments of a quantum communication device, a quantum communication system, and a quantum communication method will be described in detail with reference to the attached drawings.

First Embodiment

First, the first embodiment will be described.

Example of Device Configuration

Figure 1:
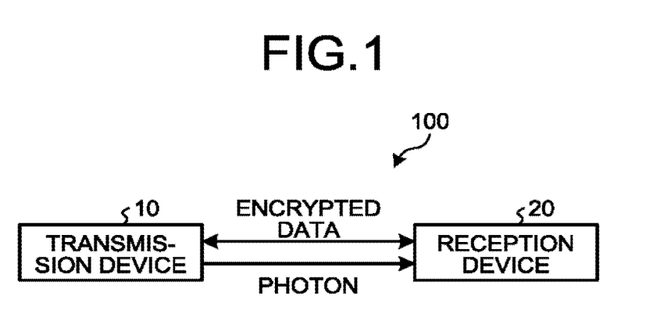
FIG. 1 is a view illustrating an example of a device configuration of a quantum communication system of a first embodiment.

FIG. 1 is a view illustrating an example of a device configuration of a quantum communication system 100 of the first embodiment. The quantum communication system 100 of the first embodiment includes two quantum communication devices (transmission device 10 and reception device 20). The transmission device 10 continuously transmits photons indicating quantum bits to the reception device 20. Note that for convenience of description, a device on a side of transmitting a photon is referred to as the transmission device 10 in the first embodiment. However, the transmission device 10 may have the function of receiving a photon. Similarly, the reception device 20 may have a function of transmitting a photon.

The transmission device 10 and the reception device 20 transmit and receive encrypted data by using quantum key data. A detail of a method of generating the quantum key data will be described with reference to FIG. 2.

Example of Functional Configuration

Figure 2:
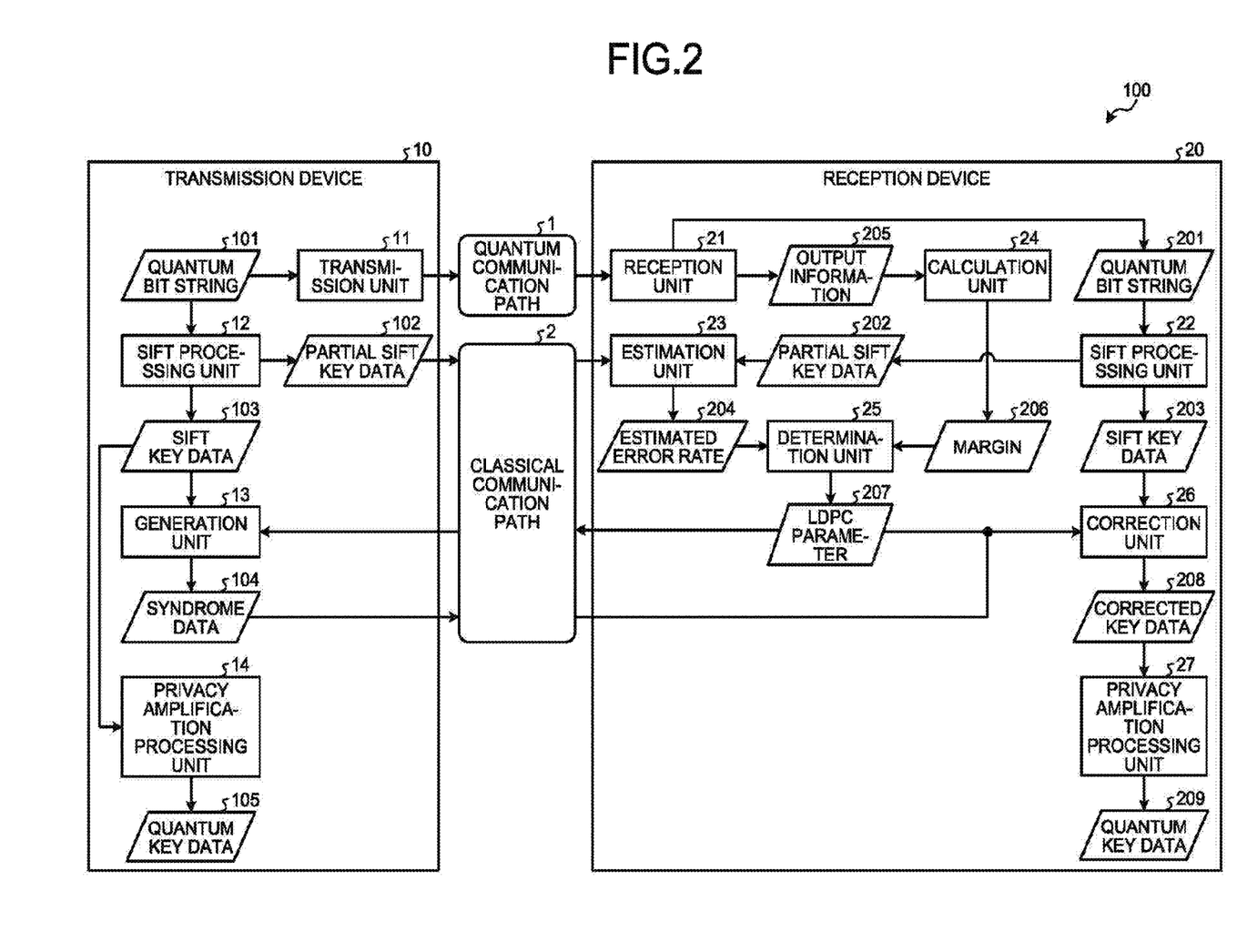
FIG. 2 is a view illustrating an example of a functional configuration of the quantum communication system of the first embodiment.

FIG. 2 is a view illustrating an example of a functional configuration of the quantum communication system 100 of the first embodiment. The quantum communication system 100 of the first embodiment includes the transmission device 10 and the reception device 20.

The transmission device 10 and the reception device 20 are connected to each other via a quantum communication path 1. The quantum communication path 1 is an optical fiber that transmits and receives a photon indicating a quantum bit. Since the quantum communication path 1 transmits and receives very weak light of a single photon, the quantum communication path 1 is easily affected by disturbance.

The transmission device 10 and the reception device 20 are connected to each other via a classical communication path 2. The classical communication path 2 transmits and receives control information for generating quantum key data 105 (209). In the example in FIG. 2, the control information is, for example, partial sift key data 102, an LDPC parameter 207, and syndrome data 104. The classical communication path 2 may be in a wired or wireless manner or may be a combination of wired and wireless manners.

The transmission device 10 includes a transmission unit 11, a sift processing unit 12, a generation unit 13, and a privacy amplification processing unit 14.

The reception device 20 includes a reception unit 21, a sift processing unit 22, an estimation unit 23, a calculation unit 24, a determination unit 25, a correction unit 26, and a privacy amplification processing unit 27.

The transmission unit 11 transmits a quantum bit swing 101 to the reception unit 21 via the quantum communication path 1. Quantum bits included in the quantum bit string 101 are represented by one basis among a plurality of bases using a quantum state of a photon. For example, polarization, a phase, and the like of a photon are used as the basis.

The reception unit 21 acquires a quantum bit string 201 by receiving the quantum bit string 101 from the transmission unit 11 via the quantum communication path 1. The reception unit 21 inputs, into the calculation unit 24, output information 205 of an optical system device used for the processing of acquiring the quantum bit string 201. A detail of the output information 205 will be described later with reference to FIG. 3.

The sift processing unit 22 performs sift processing of acquiring sift key data 203 (first sift key data) with respect to the quantum bit string 201 in a unit of a predetermined bit string according to a reference basis randomly selected from a plurality of bases. Then, the sift processing unit 22 inputs the sift key data 203 into the correction unit 26. Moreover, the sift processing unit 22 inputs partial sift key data 202 included in the sift key data 203 into the estimation unit. The partial sift key data 202 is a bit string, which has a predetermined length and is included in the sift key data 203.

The sift processing unit 12 of the transmission device 10 acquires sift key data 103 by performing sift processing on the quantum bit string 101. Then, the sift processing unit 12 inputs the sift key data 103 into the generation unit 13 and the privacy amplification processing unit 14. Moreover, the sift processing unit 12 transmits partial sift key data 102 (second partial sift key data) included in the sift key data 103 to estimation unit 23 via the classical communication path 2. The partial sift key data 102 is a bit string, which has a predetermined length and is included in the sift key data 103.

The estimation unit 23 receives the partial sift key data 102 from the sift processing unit 12 of the transmission device 10 and receives the partial sift key data 202 from the sift processing unit 22. The estimation unit 23 specifies positional information of an erroneous bit of the partial sift key data 202 by comparison between the partial sift key data 102 and the partial sift key data 202. The estimation unit 23 estimates an estimated error rate 204 of the sift key data 203 according to the positional information of the erroneous bit and an error rate of the partial sift key data 202 acquired from the number of bits of the partial sift key data 202. Then, the estimation unit 23 inputs the estimated error rate 204 into the determination unit 25.

When receiving the output information 205 from the reception unit 21, the calculation unit 24 calculates a margin 206 of the estimated error rate 204 according to the output information 205. A detail of the processing of calculating the margin 206 will be described later with reference to FIG. 4. The calculation unit 24 inputs the margin 206 into the determination unit 25.

The determination unit receives the estimated error rate 204 from the estimation unit 23 and receives the margin 206 from the calculation unit 24. The determination unit 25 determines setting information for error correction processing on the sift key data 203 based on the estimated error rate 204 and the margin 206. The setting information may be determined arbitrarily. In the description of the first embodiment, the setting information is the LDPC parameter 207. An example of the LDPC parameter 207 and a detail of a method of determining the LDPC parameter 207 will be described later with reference to FIG. 5. The determination unit 25 inputs the LDPC parameter 207 into the correction unit 26. Moreover, the determination unit 25 transmits the LDPC parameter 207 to the generation unit 13 of the transmission device 10 via the classical communication path 2.

The generation unit 1 the transmission device 10 receives the LDPC parameter 207 from the determination unit 25 of the reception device 10 and receives the sift key data 103 from the sift processing unit 12. The generation unit 13 generates the syndrome data 104 from the sift key data 103 by using the LDPC parameter 207. Then, the generation unit 13 transmits the syndrome data 104 to the correction unit the reception device 20 via the classical communication path 2.

The correction unit 26 of the reception device 20 receives the syndrome data 104 from the generation unit 13 of the transmission device 10, receives the LDPC parameter 207 from the determination unit 25, and receives the sift key data 203 from the sift processing unit 22. The correction unit 26 generates corrected key data 208 by performing error correction processing on the sift key data 203 by using the syndrome data 104 and the LDPC parameter 207. Then, the correction unit 26 inputs the corrected key data 208 into the privacy amplification processing unit 27.

When receiving the corrected key data 208 from the correction unit 26, the privacy amplification processing unit 27 generates quantum key data 209 by performing privacy amplification processing on the corrected key data 208. The privacy amplification processing is processing of enhancing confidentiality of the quantum key data 209 by compressing the corrected key data 208 and generating the quantum key data 209.

When receiving the sift key data 103 from the sift processing unit 12, the privacy amplification processing unit 14 of the transmission device 10 generates quantum key data 105, which is the same as the quantum key data 209, by performing privacy amplification processing on the sift key data 103.

Next, a detail of the output information 205 of an optical system device used in the reception unit 21 will be described with reference to FIG. 3.

Figure 3:
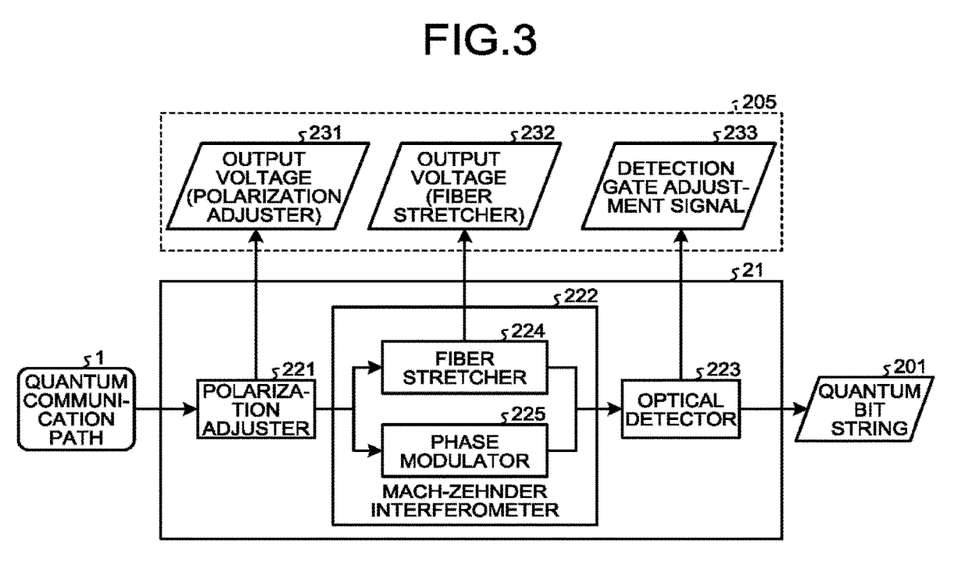
FIG. 3 is a view illustrating an example of a hardware configuration of a reception unit of the first embodiment.

FIG. 3 is a view illustrating an example of a hardware configuration of the reception unit 21 of the first embodiment. The reception unit 21 of the first embodiment is implemented by a polarization adjuster 221, the Mach-Zehnder interferometer 222, and an optical detector 223. The Mach-Zehnder interferometer 222 includes a fiber stretcher 224 and a phase modulator 225.

As factors that make quantum cryptographic communication unstable, the following three factors are considered: a change in a polarization characteristic of an optical fiber (quantum communication path 1) connecting the transmission device 10 and the reception device 20; a change in a phase characteristic of an optical fiber; and deviation in arrival time of a photon are considered. The change in a polarization characteristic and the deviation in arrival time of a photon are caused by a change in an external environment such as a temperature of an optical fiber laid section. The change in a phase characteristic is caused by a change in a path length of the optical fiber. The change in a path length of the optical fiber is caused by a change in a temperature or the like in a room in which the transmission device 10 and the reception device 20 are provided. When the change in a polarization characteristic of the optical fiber the change in a phase characteristic of the optical fiber, and the deviation in arrival time of a photon are caused, an error rate of the quantum communication path 1 is increased.

The polarization adjuster 221 adjusts polarization of the optical fiber in order to compensate for the change in a polarization characteristic of the optical fiber. The fiber stretcher 224 adjusts a path length of the optical fiber in order to compensate for the change in a phase characteristic of the optical fiber. The phase modulator 225 demodulates a phase of a photon modulated by the transmission device 10. While compensating for the deviation in arrival time of a photon by adjusting a detection gate of a photon, the optical detector 223 detects a photon and acquires a plurality of quantum bit strings 201.

The output information 205 includes an output voltage 231 of the polarization adjuster 221, an output voltage 232 of the fiber stretcher 224, and a detection gate adjustment signal 233. The output voltage 231 of the polarization adjuster 221 is a voltage used for control of adjusting polarization of the optical fiber. The output voltage 232 of the fiber stretcher 224 is a voltage used for control of adjusting a path length of the optical fiber. The detection gate adjustment signal 233 is a voltage used for control of adjusting a detection gate of a photon.

Next, a detail of the processing of calculating the margin 206 will be described with reference to FIG. 4.

Figure 4:
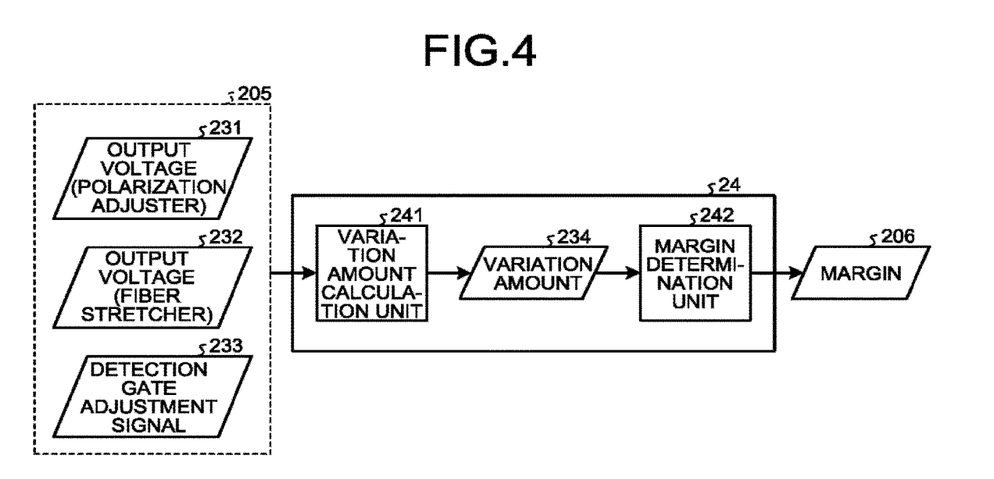
FIG. 4 is a view illustrating an example of a functional configuration of a calculation unit of the first embodiment.

FIG. 4 is a view illustrating an example of a functional configuration of the calculation unit 24 of the first embodiment. The calculation unit 24 of the first embodiment includes a variation amount calculation unit 241 and a margin determination unit 242.

A variation in the output voltage 231 of the polarization adjuster 221 and a variation in the detection gate adjustment signal 233 correspond to a variation in a polarization characteristic of the optical fiber (quantum communication path 1) and a variation in deviation in arrival time of a photon. Thus, the larger the variation in the output voltage 231 of the polarization adjuster 221 and the variation in the detection gate adjustment signal 233 is, the more unstable a state of the quantum communication path 1 becomes.

A variation in the output voltage 232 of the fiber stretcher 224 corresponds to a variation in a phase characteristic of the optical fiber (quantum communication path 1). The lager the variation in the output voltage 232 of the fiber stretcher 224 is, the more unstable a state of the quantum communication path 1 becomes.

In summary, the larger the variation in the output information 205 (output voltage 231, output voltage 232, and detection gate adjustment signal 233) is, the more unstable a state of the quantum communication path 1 becomes.

When receiving the output information 205 from the reception unit 21, the variation amount calculation unit 241 calculates a variation amount 234 of each of the output voltage 231, the output voltage 232, and the detection gate adjustment signal 233 included in the output information 205. The variation amount 234 is, for example, an amount obtained by accumulating absolute values of variation in unit time. The variation amount calculation unit 241 inputs the variation amount 234 into the margin determination unit 242.

When receiving the variation amount 234 from the variation amount calculation unit 241, the margin determination unit 242 determines the margin 206 based on the variation amount 234.

For example, in a case where the variation amount 234 is a variation amount of the output voltage 231 of the polarization adjuster 221, the margin determination unit 242 determines the margin 206 according to a ratio of the variation amount 234 to the maximum variation range of voltage determined in the polarization adjuster 221. More specifically, the margin determination unit 242 determines the margin 206 as 5% in a case where the variation amount 234 per minute is 5% or less of the maximum variation range, for example. For example, the margin determination unit 242 determines the margin 206 as 10% in a case where the variation amount 234 per minute is 5% to 10% of the maximum variation range. For example, the margin determination unit 242 determines the margin 206 as 15% in a case where the variation amount 234 per minute is 10% to 15% of the maximum variation range. For example, the margin determination unit 242 determines the margin 206 as 20% in a case where the variation amount 234 per minute exceed 20% of the maximum variation range.

For example, in a case where the variation amount 234 is a variation amount of the output voltage 232 of the fiber stretcher 224, the margin determination unit 242 determines the margin 206 according to a ratio of the variation amount 234 to the maximum variation range of voltage determined in the fiber stretcher 224.

For example, in a case where the variation amount 234 is a variation amount of the detection gate adjustment signal 233, the margin determination unit 242 determines the margin 206 according to a ratio of the variation amount 234 to a drive cycle of a detection gate signal of the optical detector 223.

Next, an example of the LDPC parameter 207 and a detail of a method of determining the LDPC parameter 207 will be described with reference to FIG. 5.

Figure 5:
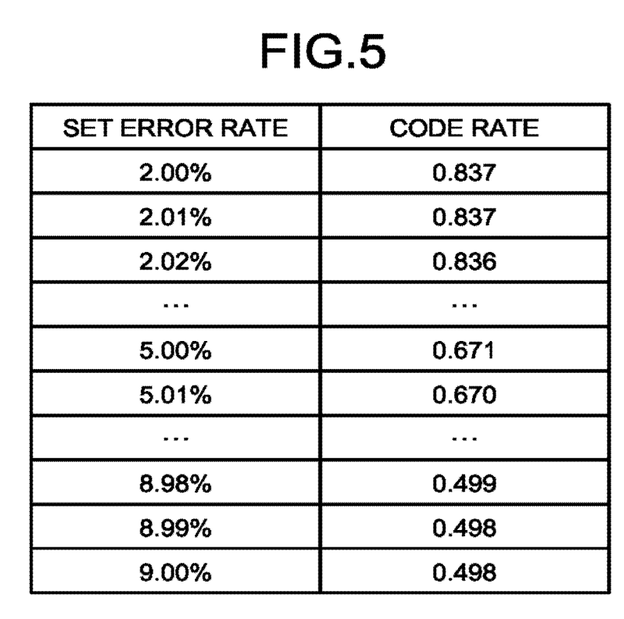
FIG. 5 is a view illustrating an example of an LDPC parameter of the first embodiment.

FIG. 5 is a view illustrating an example of the LDPC parameter 207 of the first embodiment. In the example in FIG. 5, a case where the LDPC parameter 207 is a code rate of an LDPC code is illustrated. The determination unit 25 determines the code rate (LDPC parameter 207) according to a set error rate. The set error rate is calculated from the estimated error rate 204 and the margin 206. For example, in a case where the estimated error rate 204 is 2% and the margin 206 is 20%, the determination unit 25 determines set error rate as 2.4%(=2×1.2). The determination unit 25 determines the code rate (LDPC parameter 207) from the set error rate by using table information illustrated in FIG. 5, for example.

As described above, in the reception device 20 (quantum communication device) of the first embodiment, the reception unit 21 receives a quantum bit, which is represented by one basis among a plurality of bases using a quantum state of a photon, from the transmission device 10 via the quantum communication path 1, and acquires the quantum bit string 201 including a plurality of received quantum bits. The sift processing unit 22 performs sift processing of acquiring the sift key data 203 (first sift key data) with respect to the quantum bit string 201 in a unit of a predetermined bit string according to a reference basis randomly selected from a plurality of bases. From the estimated error rate 204 of the sift key data 203 and the margin 206 of the estimated error rate 204, the determination unit 25 determines setting information (LDPC parameter 207) for error correction processing on the sift key data 203. Then, the correction unit 26 generates the corrected key data by performing the error correction processing with the setting information.

In the error correction processing in quantum cryptographic communication, it is necessary to transfer the syndrome data 104 via the classical communication path 2. Since the syndrome data 104 is information related to the sift key data 103, it is necessary to prevent an eavesdropper who may be lurking in the classical communication path 2 from knowing this as much as possible. Thus, it is ideal to determine the LDPC parameter 207 with which it is possible to correct the sift key data 203 and with which a transfer amount of the syndrome data 104 is minimized. However, since the quantum communication path 1 affecting an error rate of the sift key data 203 is easily affected by disturbance, a state of the quantum communication path 1 is unstable. Moreover, a true value of the error rate (correct error rate) of the sift key data 203 to be corrected is unknown until correction processing is actually performed. It is ideal that the LDPC parameter 207 corresponding to the true value of the error rate of the sift key data 203 to be corrected is determined.

In the reception device 20 (quantum communication device) of the first embodiment, the calculation unit 24 calculates the margin 206 from the output information 205 indicating a behavior of an optical system device. That is, the reception device 20 (quantum communication device) of the first embodiment predicts a state of the quantum communication path 1 according to the margin 206 calculated from the output information 205. Then, the determination unit 25 determines the setting information (LDPC parameter 207) in consideration of the margin 206 and the estimated error rate 204. According to the quantum communication system 100 of t first embodiment, it is therefore possible to more appropriately determine the setting information of the error correction processing.

Second Embodiment

Next, the second embodiment will be described. In a description of the second embodiment, a description similar to that of the first embodiment will be omitted, and a part different from the first embodiment will be described. In the second embodiment, a method of estimating an estimated error rate 204 is different from that of the first embodiment.

Example of Functional Configuration

Figure 6:
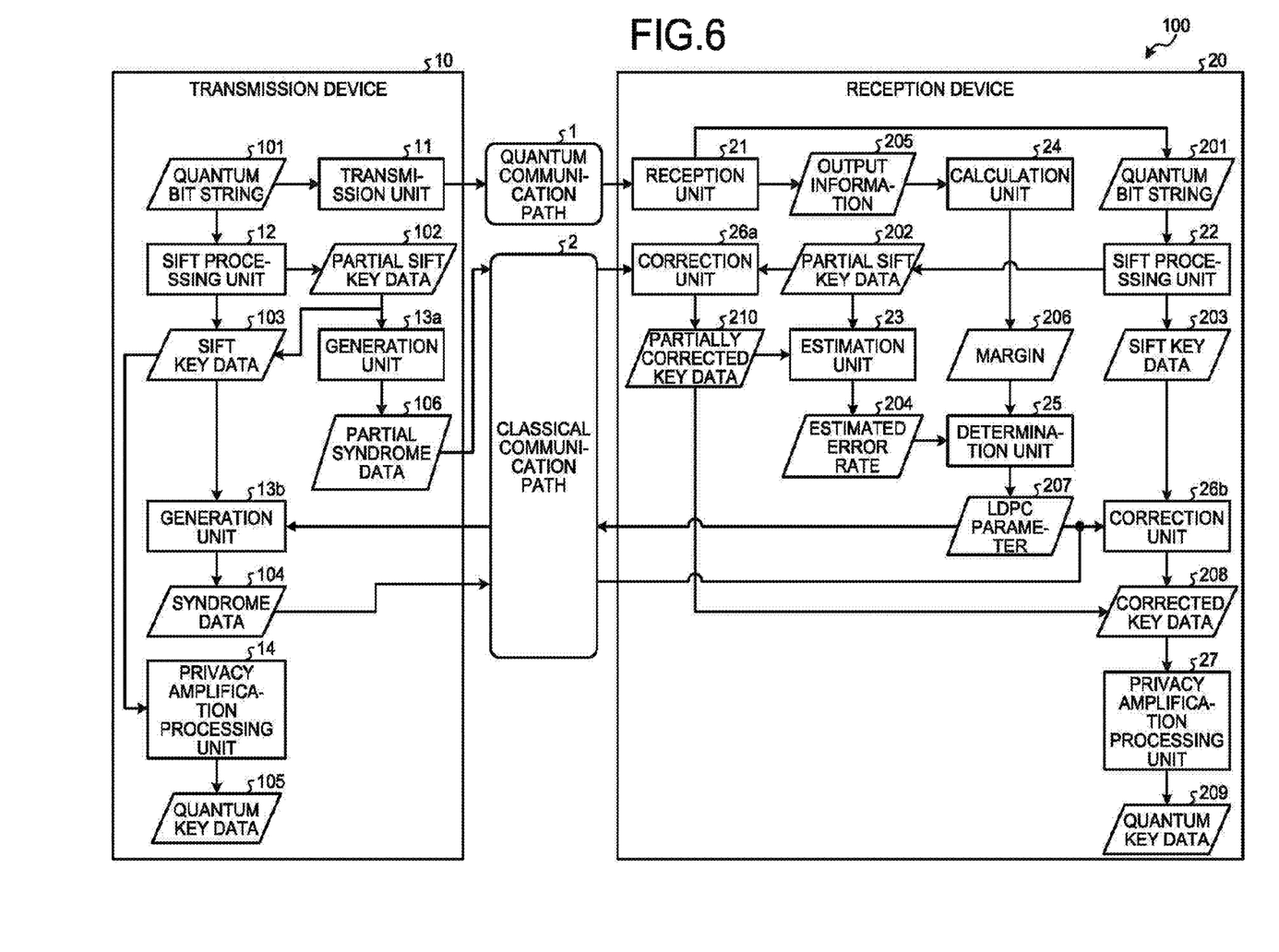
FIG. 6 is a view illustrating an example of a functional configuration of a quantum communication system of a second embodiment.

FIG. 6 is a view illustrating an example of a functional configuration of a quantum communication system 100 of the second embodiment. The quantum communication system 100 of the second embodiment includes a transmission device 10 and a reception device 20.

The transmission device 10 includes a transmission unit 11, a sift processing unit 12, a generation unit 13a, a generation unit 13b, and a privacy amplification processing unit 14.

The reception device 20 includes a reception unit 21, a sift processing unit 22, an estimation unit 23, a calculation unit 24, a determination unit 25, a correction unit 26a, a correction unit 26b, and a privacy amplification processing unit 27.

Similarly to the first embodiment, the sift processing unit 12 of the transmission device 10 acquires partial sift key data 102 and sift key data 103 from a quantum bit string 101. The sift processing unit 12 inputs the partial sift key data 102 into the generation unit 13a and the sift key data 103 into the generation unit 13b.

Note that the partial sift key data 102 is not transmitted to the reception device 20 in the second embodiment. Thus, the partial sift key data 102 may be included in the sift key data 103 to be subjected to an object of privacy amplification processing.

When receiving the partial sift key data 102 from the sift processing unit 12, the generation unit 13a generates partial syndrome data 106 from the partial sift key data 102. Then, the generation unit 13a transmits the partial syndrome data 106 to the correction unit 26a of the reception device 20 via a classical communication path 2.

Since an operation of the generation unit 13b is the same as that of the generation unit 13 of the first embodiment, a description thereof is omitted.

The correction unit 26a of the reception device 20 receives the partial syndrome data 106 from the generation unit 13a of the transmission device 10 and receives partial sift key data 202 from the sift processing unit 22. The correction unit 26a generates partially corrected key data 210 by performing error correction processing on the partial sift key data 202 (first partial sift key data) by using the partial syndrome data 106. Then, the correction unit 26a inputs the partially corrected key data 210 into the estimation unit 23.

Note that the partial sift key data 102 is not transmitted to the reception device 20 in the second embodiment. Thus, the partially corrected key data 210 generated from the partial sift key data 202 corresponding to the partial sift key data 102 may be included in corrected key data 208 to be subjected to the privacy amplification processing.

The estimation unit 23 receives the partial sift key data 202 from the sift processing unit 22 and receives the partially corrected key data 210 from the correction unit 26a. Based on positional information of an erroneous bit which is acquired by comparison between the partially corrected key data 210 and the partial sift key data 202 (first partial sift key data), the estimation unit 23 estimates an estimated error rate 204 of the sift key data 203.

Since an operation of the correction unit 26b is the same as that of the correction unit 26 of the first embodiment, a description thereof is omitted.

Note that the generation unit 13a and 13b described above may be implemented as one generation unit. Similarly, the correction units 26a and 26b described above may be implemented as one correction unit.

As described above, according to the quantum communication system 100 of the second embodiment, similarly to a case of the first embodiment, setting information of the error correction processing can be more appropriately determined.

Third Embodiment

Next, the third embodiment will be described. In the description of the third embodiment, a description similar to that of the first embodiment will be omitted, and a part different from the first embodiment will be described. In the third embodiment, a method of estimating an estimated error rate 204 is different from that of the first embodiment.

Example of Functional Configuration

Figure 7:
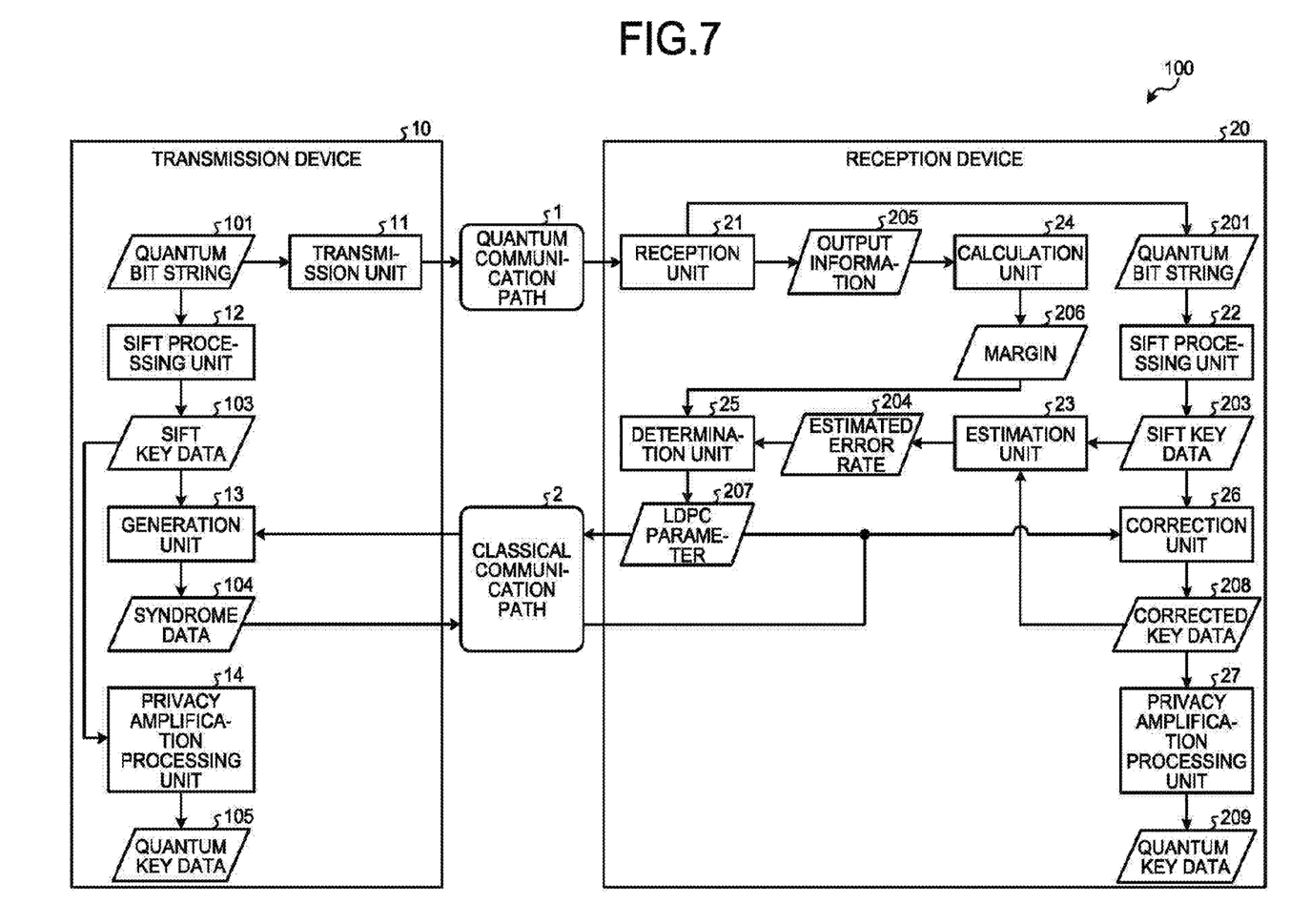
FIG. 7 is a view illustrating an example of a functional configuration of a quantum communication system of a third embodiment.

FIG. 7 is a view illustrating an example of a functional configuration of a quantum communication system 100 of the third embodiment. The quantum communication system 100 of the third embodiment includes a transmission device 10 and a reception device 20.

The transmission device 10 includes a transmission unit 11, a sift processing unit 12, a generation unit 13, and a privacy amplification processing unit 14.

The reception device 20 includes a reception unit 21, a sift processing unit 22, an estimation unit 23, a calculation unit 24, a determination unit 25, a correction unit 26, and a privacy amplification processing unit 27.

The estimation unit 23 estimates an estimated error rate 204 based on positional information of an erroneous bit acquired by comparison between sift key data 203 (first sift key data) acquired by previous sift processing and corrected key data 208 generated by previous error correction processing. That is, the estimation unit 23 estimates an estimated error rate 204 of sift key data 203 to be subjected to next error correction processing, according to an error rate of the sift key data 203 acquired by the previous sift processing.

Note that in a case where preceding error correction processing fails, the determination unit 25 may determine an LDPC parameter 207, which has the highest correction capability among usable LDPC parameters 207, as an LDPC parameter 207 used for error correction processing, for example. Alternatively, for example, the estimation unit 23 may estimate an estimated error rate 204 according to an error rate of sift key data 203 in the last successful correction.

As described above, according to the quantum communication system 100 of the third embodiment, similarly to a case of the first embodiment, setting information of the error correction processing can be more appropriately determined.

Figure 8:
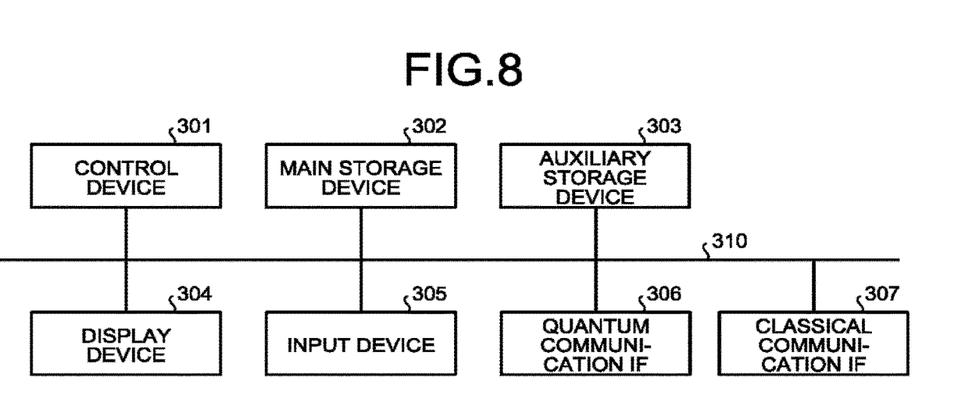
FIG. 8 is a view illustrating an example of a hardware configuration of a main part of each of transmission devices and reception devices of the first to third embodiments.

Finally, an example of hardware configurations of the transmission device 10 and the reception device 20 of each of the first to third embodiments will be described.

Example of Hardware Configuration

FIG. 8 is a view illustrating an example of a configuration of a main part of each of the transmission devices 10 and the reception devices 20 of the first to third embodiments. Each of the transmission devices 10 and the reception devices 20 of the first to third embodiments includes a control device 301, a main storage device 302, an auxiliary storage device 303, a display device 304, an input device 305, a quantum communication interface (IF) 306, and a classical communication IF 307.

The control device 301, the main storage device 302, the auxiliary storage device 303, the display device 304, the input device 305, the quantum communication IF 306, and the classical communication IF 307 are connected to each other via a bus 310.

The control device 301 executes a program read from the auxiliary storage device 303 into the main storage device 302. The main storage device 302 is a memory such as a read only memory (ROM) or a random access memory (RIM). The auxiliary storage device 303 is a hard disk drive (HDD), memory card, or the like.

The display device 304 displays states of the transmission device 10 and the reception device 20, and the like. The input device 305 receives an input from a user.

The quantum communication IF 306 is an interface for connection to the quantum communication path 1. The quantum communication IF 306 of the reception device 20 includes hardware configuration of the reception unit 21 described above (see FIG. 3). The classical communication IF 307 is an interface for connection to the classical communication path 2.

Each of the transmission devices 10 and the reception devices 20 of the first to third embodiments can be implemented by an arbitrary device including a general-purpose computer or the like as long as the hardware configuration in FIG. 8 is included.

A program executed by each of the transmission devices 10 and the reception devices 20 of the first to third embodiments is provided as a computer program product while being stored as a file in an installable format or an executable format in a computer-readable storage medium such as a CD-ROM, a memory card, a CD-R, or a digital versatile disc (DVD).

Also, the program executed by each of the transmission devices 10 and the reception devices 20 of the first to third embodiments may be stored in a computer connected to a network such as the Internet and may be provided by being downloaded via the network.

Also, the program executed by each of the transmission devices 10 and the reception devices 20 of the first to third embodiments may be provided via a network such as the Internet without being downloaded.

Also, the program executed by each of the transmission devices 10 and the reception devices 20 of the first to third embodiments may be previously incorporated in a ROM or the like and provided.

The program executed by each of the transmission devices 10 and the reception devices 20 of the first to third embodiments has a module configuration including a function that can be implemented by the program among functional configurations of the transmission device 10 and the reception device 20 of each of the first to third embodiments.

The control device 301 reads a program from a storage medium such as the auxiliary storage device 303 and executes the program, whereby a function implemented by the program is loaded into the main storage device 302. That is, the function implemented by the program is generated on the main storage device 302.

A part or a whole of functions of the transmission device 10 and the reception device 20 of each of the first to third embodiments may be implemented by hardware such as an integrated circuit (IC). The IC is, for example, a processor that executes dedicated processing.

In a case where functions are implemented with a plurality of processors, each processor may implement one of the functions or may implement two or more of the functions.

Also, operation forms of the transmission device 10 and the reception device 20 of each of the first to third embodiments may be arbitrary. The transmission device 10 and the reception device 20 of each of the first to third embodiments may be operated as devices included in a cloud system on a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum communication device adapted to correct first sift key data acquired by performing sift processing with respect to a quantum cryptographic key bit string received from a transmission device via a quantum communication path, the quantum communication device comprising:
   one or more hardware processors electrically coupled to a memory, and configured to:
   calculate a margin of an estimated error rate on the basis of at least one of a change in a polarization characteristic of the quantum communication path, a change in a phase characteristic of the quantum communication path, and deviation in an arrival time of a photon by using output information of an optical system device used to receive the quantum cryptographic key bit string;
   determine a code rate of error correction processing on the first sift key data according to a set error rate, the set error rate being calculated from the estimated error rate of the first sift key data and the margin of the estimated error rate; and generate corrected key data by performing the error correction processing using the code rate.

2. The quantum communication device according to claim 1, wherein the one or more hardware processors are further configured to:
estimate the estimated error rate by comparison between first partial sift key data included in the first sift key data and second partial sift key data included in second sift key data acquired by the sift processing by the transmission device.

3. The quantum communication device according to claim 1, wherein
the one or more hardware processors generate partially corrected key data by performing the error correction processing on first partial sift key data included in the first sift key data, and
the one or more hardware processors are further configured to estimate the estimated error rate by comparison between the partially corrected key data and the first partial sift key data.

4. The quantum communication device according to claim 1, wherein the one or more hardware processors are further configured to:
estimate the estimated error rate by comparison between the first sift key data acquired by previous sift processing and the corrected key data generated by previous error correction processing.

5. The quantum communication device according to claim 1, wherein
the optical system device is a polarization adjuster, and
the one or more hardware processors calculate the margin based on a variation amount of an output voltage of the polarization adjuster.

6. The quantum communication device according to claim 1, wherein
the optical system device is a fiber stretcher, and
the one or more hardware processors calculate the margin based on a variation amount of an output voltage of the fiber stretcher.

7. The quantum communication device according to claim 1, wherein
the optical system device is an optical detector, and
the one or more hardware processors calculate the margin based on a variation amount of a detection gate adjustment signal of the optical detector.

8. A quantum communication system comprising:
a transmission device; and
a receiver configured to correct first sift key data acquired by performing sift processing with respect to a quantum cryptographic key bit string received from the transmission device via a quantum communication path, wherein
the receiver comprises:
one or more hardware processors electrically coupled to a memory, and configured to:
calculate a margin of an estimated error rate on the basis of at least one of a change in a polarization characteristic of the quantum communication path, a change in a phase characteristic of the quantum communication path, and deviation in an arrival time of a photon by using output information of an optical system device used to receive the quantum cryptographic key bit string;
determine a code rate of error correction processing on the first sift key data according to a set error rate, the set error rate being calculated from the estimated error rate of the first sift key data and the margin of the estimated error rate, and
generate corrected key data by performing the error correction processing using the code rate.

9. A quantum communication method used for a quantum communication device configured to correct first sift key data acquired by performing sift processing with respect to a quantum cryptographic key bit string received from a transmission device via a quantum communication path, the method comprising:
calculating a margin of an estimated error rate on the basis of at least one of a change in a polarization characteristic of the quantum communication path, a change in a phase characteristic of the quantum communication path, and deviation in an arrival time of a photon by using output information of an optical system device used to receive the quantum cryptographic key bit string;
determining a code rate of error correction processing on the first sift key data according to a set error rate, the set error rate being calculated from the estimated error rate of the first sift key data and the margin of the estimated error rate; and
generating corrected key data by performing the error correction processing using the code rate.

* * * * *